(12) United States Patent
Mayer et al.

(10) Patent No.: US 6,326,088 B1
(45) Date of Patent: *Dec. 4, 2001

(54) DIFFUSION-SOLDERED JOINT AND METHOD FOR MAKING DIFFUSION-SOLDERED JOINTS

(76) Inventors: Rolf Mayer, Kastanienstr. 53, 71364 Winnenden; Rolf Engelhart, Schulstr. 14, 71296 Heimsheim; Wilfried Reschnar, Sturmfederstr. 36, 74360 Ilsfeld; Godehard Schmitz, Friedrichstr. 15/1, 74372 Sersheim, all of (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/908,632

(22) Filed: Aug. 7, 1997

(30) Foreign Application Priority Data

Aug. 10, 1996 (DE) .............................. 196 32 378

(51) Int. Cl.[7] .......................... B32B 15/00; B23K 35/26
(52) U.S. Cl. .................. 428/615; 428/627; 428/629; 428/666; 428/645; 428/646; 228/56.3; 228/194; 228/246; 228/249
(58) Field of Search .................. 428/610, 627, 428/629, 643, 644, 645, 647, 646, 648, 674, 666, 680, 681; 228/194, 246, 249, 187, 56.3

(56) References Cited

U.S. PATENT DOCUMENTS

| | | | | |
|---|---|---|---|---|
| 3,675,311 | * | 7/1972 | Wells | 228/194 |
| 3,981,429 | * | 9/1976 | Parker | 228/194 |
| 4,005,454 | * | 1/1977 | Froloff et al. | 357/65 |
| 4,033,504 | * | 7/1977 | Fletcher et al. | 228/194 |
| 4,270,069 | * | 5/1981 | Wiehler | 315/3.5 |
| 4,872,606 | * | 10/1989 | Satoh et al. | 228/194 |
| 4,988,035 | * | 1/1991 | Ueno et al. | 228/194 |
| 5,242,099 | * | 9/1993 | Ueda | 228/123.1 |
| 5,439,164 | * | 8/1995 | Hasegawa et al. | 228/194 |
| 5,485,950 | * | 1/1996 | Shibata et al. | 228/194 |
| 5,620,130 | * | 4/1997 | Schneider et al. | 228/194 |

FOREIGN PATENT DOCUMENTS

| | | | | |
|---|---|---|---|---|
| 44 12 792 A 1 | | 10/1995 | (DE) . | |
| 0229954 | * | 7/1987 | (EP) . | |
| 55-112190 | * | 8/1980 | (JP) | 228/194 |
| 57-184574 | * | 11/1982 | (JP) | 228/194 |
| 58-77784 | * | 5/1983 | (JP) | 228/194 |
| 63-49381 | * | 3/1988 | (JP) | 228/194 |
| 1632706 | * | 3/1991 | (SU) | 228/194 |

OTHER PUBLICATIONS

Semalloy Solder Alloys, Semi–Alloys Technical Bulletin No. SA–64, five pages, Jul. 1968.*

PREFORM, Alloys Unlimited, Inc. brochure, p. 5, 1959, (No month).*

A. D. Merriman, "A Dictionary of Metallurgy", 1958 (no month), "Solder", "Soldering", p. 328.*

Howard H. Manko, "Solders and Soldering", 1964 (no month), p. 109, 1958.*

W. Krause, "Konstruktionselemente der Feinmechanik", pp. 196–201 (No date provided).

* cited by examiner

Primary Examiner—John J. Zimmerman

(57) ABSTRACT

A diffusion-soldered joint and a method for making diffusion-soldered joints includes a particularly actively diffusing, low-melting-point intermediate layer, applied in the molten state, introduced in the form of a solder carrier between at least two joint components. The solder carrier includes a metal foil that is equipped on both sides with solder layers, wherein the solder layers may include multiple layers.

14 Claims, 2 Drawing Sheets

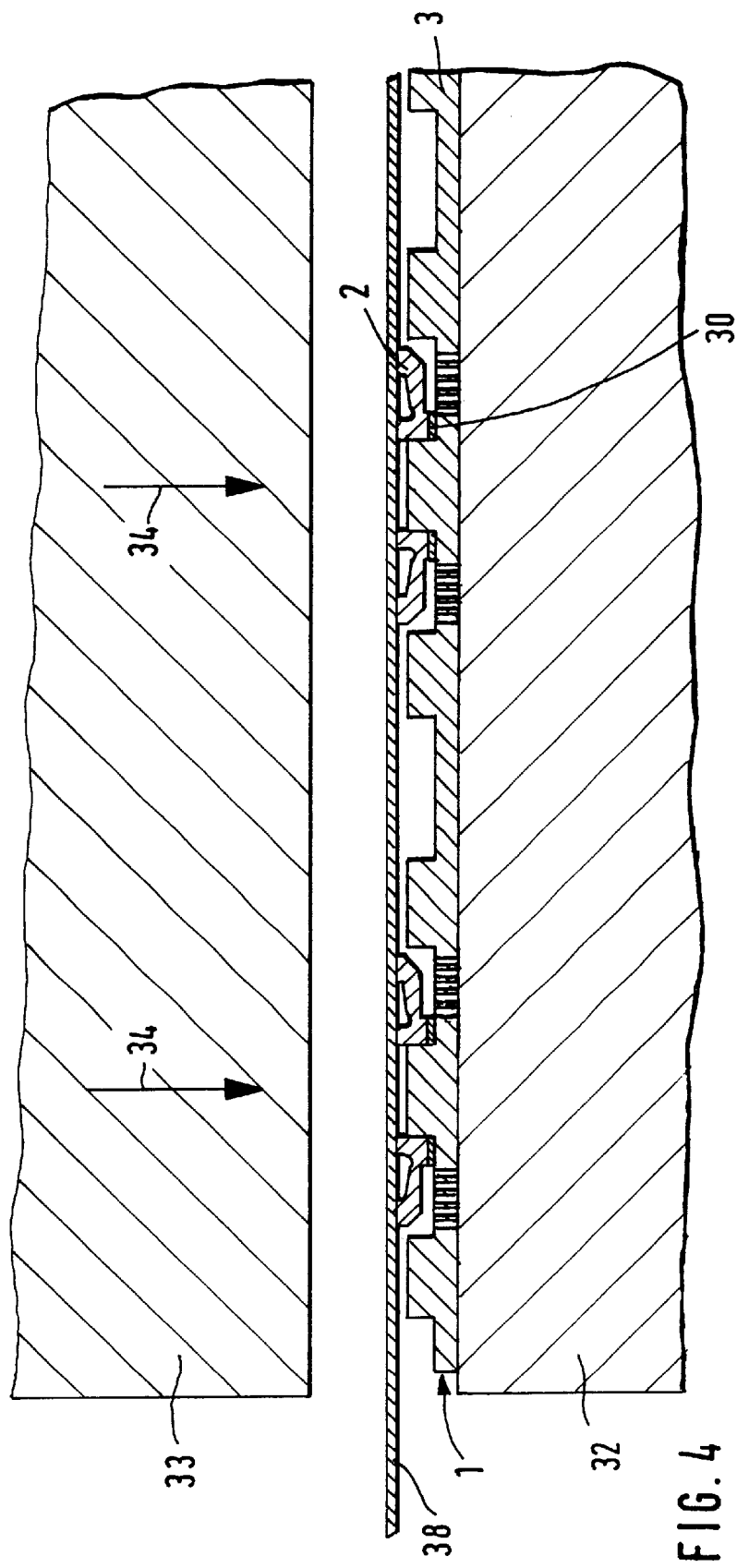

DIFFUSION-SOLDERED JOINT AND METHOD FOR MAKING DIFFUSION-SOLDERED JOINTS

FIELD OF THE INVENTION

The present invention relates to a diffusion-soldered joint and to a method for making diffusion-soldered joints.

BACKGROUND INFORMATION

Diffusion-soldering is based on the fact that two base materials present in solid phases can diffuse into one another even at a temperature well below the melting point of a joint component. A suitable solder is placed between the soldering surfaces of the base materials, and the joint components are pressed together and heated for a long period. The result is a vacuum-tight, nondetachable joint. It is also known, instead of a separate solder, to produce diffusion-promoting layers, partially or over the entire surface, on the base materials by galvanic deposition, metallization, or vacuum sputtering, or by plasma spraying. The base materials are then pressed together and heated. Layers of pure tin, pure indium, or pure bismuth are known as diffusion-promoting layers of this kind. Solder joints made in this fashion have, however, only limited mechanical and thermal strength.

A method for joining planar workpieces, in which the workpieces participate in a direct joint by means of soldering or diffusion joining under vacuum, is already known from German Unexamined Patent Application No. 44 12 792. For this purpose, the workpieces are held in a sealed vacuum chamber, a melting intermediate layer being applied between the workpieces being joined. The intermediate layers are comprised of solders known in the art, which are introduced in the form of foils, powders, or granules.

Conventional joining methods such as soft soldering, brazing, and welding are used to produce joints which disadvantageously either have insufficient strength or require excessive joining temperatures. Such methods are therefore unsuitable when requirements exist for high thermal and mechanical strength over large areas (e.g., wafers) and for the lowest possible joining temperature in order to retain the original strength of the base materials of the joint components while maintaining very close dimensional tolerances.

SUMMARY OF THE INVENTION

The diffusion-soldered joint according to the present invention has the advantage that at a comparatively low joining temperature, at which the original strength of the joined materials is maintained, high thermal and mechanical strength of the components being joined (joint components) is achieved. The strength attained in the diffusion-soldered joint according to the present invention is comparable to that of brazed joints; the joining temperature (e.g., 250° C. to 450° C.) is considerably lower than in the case of brazed joints, so that, for example, the work-hardening produced by rolling, and the spring properties of the toughened joined materials are retained. As a consequence, very close dimensional tolerances for the joint components can be maintained.

With the solder carrier introduced between two joint components, it is possible in a simple manner to apply particularly actively diffusing, low-melting-point intermediate layers, applied in the molten state, to specific areas of the components being joined. The solder carriers allow very reliable, uncomplicated, and precisely targeted application of the aforesaid intermediate layers. Particularly advantageous in this context is the possibility of also applying a solder carrier of this kind to soldered parts that cannot be immersed in solder.

It is particularly advantageous to solder-coat a thin metal foil in a solder bath, using a passthrough method, in order to obtain a suitable solder carrier. Low-melting-point soft-solder alloys are suitable in this context as solder layers. The low-melting-point coating alloys can also, advantageously, be applied as multilayers in the form of their respective individual constituents, galvanically or by vacuum metallization, layer thicknesses of 1 to 10 micrometers in each case being preferred.

The method according to the present invention for making diffusion-soldered joints has the advantage of being applicable very reliably and precisely to produce high-strength joints in the case of joint components having relatively large areas. When large-area components are being joined, for example onto a wafer, it is advantageous to arrange an expendable, plastically deformable, solder-rejecting, and thermally conductive insert foil between a ram of the diffusion-soldering tool and the joint components. The insert foil allows compensation for dimensional tolerances in the height of the individual parts being joined, and thus approximately uniform distribution of the ram pressure. Lastly, joints of approximately uniform strength over a large area are obtained in this fashion. The aluminum or chromium layers of the insert foils guarantee good thermal conduction and distribution, and solder rejection.

BRIEF DESCRIPTION OF THE DRAWINGS

Exemplary embodiments of the present invention are illustrated in the drawings and explained in greater detail hereafter.

FIG. 4 is a schematic depiction of a tool for making diffusion-soldered joints on large-area joint components according to an embodiment of the present invention.

DETAILED DESCRIPTION OF THE INVENTION

Figure 1:
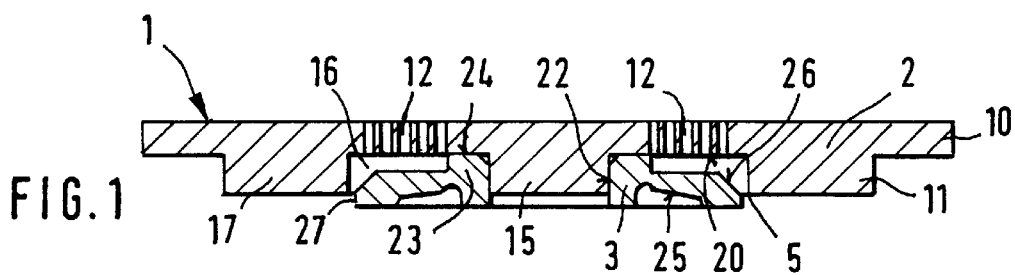
FIG. 1 depicts a two-part nozzle plate as defined by the method according to an embodiment of the present invention for making a diffusion-soldered joint.

FIG. 1 shows a two-part nozzle plate 1 in which an upper nozzle part 2 and a lower nozzle part 3, as the two joint components, are immovably joined to one another according to an embodiment of the present invention by means of a diffusion-soldering method. Nozzle plate 1 depicted in FIG. 1 is only a selected example of how diffusion-soldered joints are made. Nozzle plate 1 is characterized, for example, by the presence of two extremely precisely shaped individual components, which must be joined with exact positional accuracy in order to form fine structures, for example a very narrow peripheral annular gap 5. A nozzle plate 1 of this kind is particularly suitable for injection valves, atomization nozzles, painting nozzles, and other spraying devices, for example as described in German Patent No. 196 22 350.4.

Upper nozzle part 2 and lower nozzle part 3 are produced, for example, using the known MIGA (microstructuring, galvanoforming, shaping) or LIGA (lithography, galvanoforming, shaping) technique. Production can be accomplished on "wafers" having several hundred nozzle plates 1 arranged in a grid pattern, thereby greatly reducing the work required for each nozzle plate 1.

Upper nozzle part 2 is comprised of, for example, two axially successive functional planes 10 and 11. While the upper circular functional plane 10 contains a filter structure 12, arranged for example in annular fashion with, for example, honeycomb-like pores and, except for the fine-pore filter structure 12, is constituted entirely of material, the circular lower functional plane 11, configured for example with a somewhat smaller outside diameter than upper functional plane 10, possesses an inner material region (e.g., fitting element 15), an annular open region 16 adjacent radially to the outside, and an annular outer material region 17 which completely radially surrounds the open region 16.

The central fitting element 15 provides for better joining of the two parts 2, 3 of nozzle plate 1. When nozzle plate 1 is in the assembled state, lower nozzle part 3 largely fills up open region 16 of lower functional plane 11 of upper nozzle part 2. Filter structure 12 opens, at a lower end surface 20 of upper functional plane 10, into the annular channel-like open region 16, which is thus delimited with respect to upper functional plane 10 and is open toward the bottom so that lower nozzle part 3 can be inserted into it and can constitute, for example, annular gap 5.

Both upper nozzle part 2 and lower nozzle part 3 are made of, for example, NiCo, Ni, Fe, or Cu that has been galvanically deposited onto previously fabricated plastic negatives. The final dimensions of parts 2, 3 are achieved, for example, by grinding. The annular lower nozzle part 3 possesses a central inner through opening 22 into which fitting element 15 of upper nozzle part 2 can engage in dimensionally precise fashion. The outer dimensions of lower nozzle part 3 are defined by the size of open region 16 into which it is at least partially introduced. In addition to precise fabrication of through opening 22, an upper contact shoulder 23, projecting toward upper nozzle part 2 and having an upper end face 24, must also be configured very precisely. A lower end face 25, opposite contact shoulder 23, of lower nozzle part 3 does not need to be precisely fashioned, since this region is not required during joining and lies outside the flow path.

The stepped outer contour of lower nozzle part 3 comprises, for example, a peripheral bevel 26 which is located in open region 16 when nozzle plate 1 is in the assembled state and allows improved flow of a fluid from filter structure 12 to the spray geometry (annular gap 5). Adjacent to bevel 26, which widens in the direction of flow, is also, for example, a vertical delimiting surface 27 which is located downstream from annular gap 5 after assembly.

After production of the two individual parts 2 and 3, the two parts 2 and 3 are assembled and joined into an annular-gap nozzle. The joining technique used for exact positionally accurate joining of parts 2 and 3 with the least possible negative mechanical and thermal effects is a diffusion-soldering method for making a diffusion-soldered joint according to the present invention.

Figure 2:
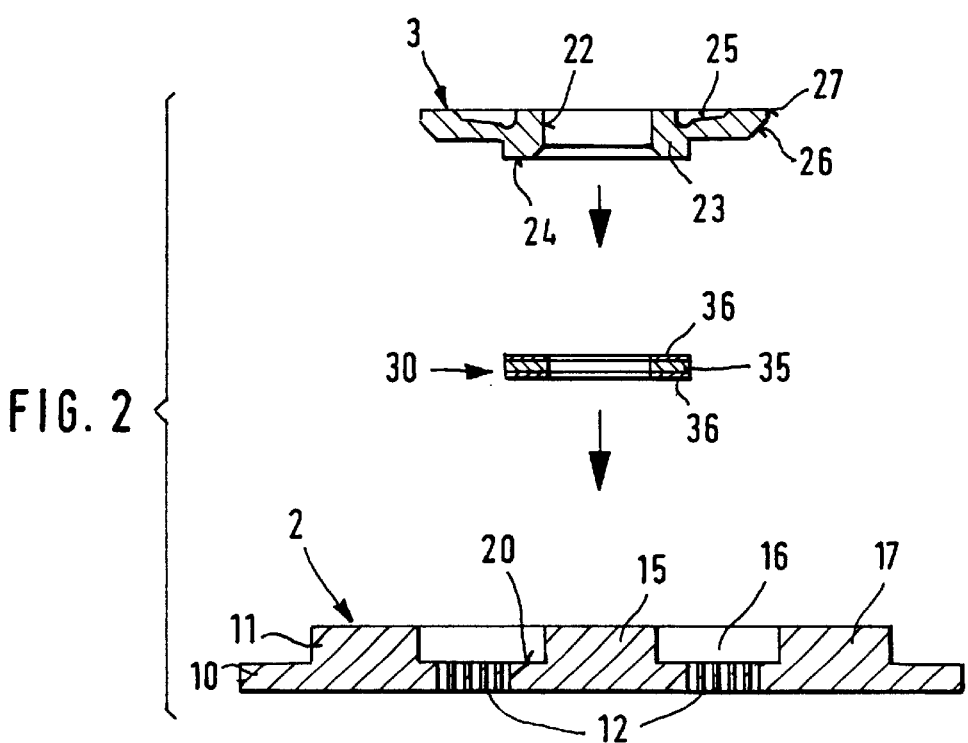
FIG. 2 depicts the individual components of the nozzle plate according to an embodiment of the present invention, together with a solder carrier.
Figure 3:
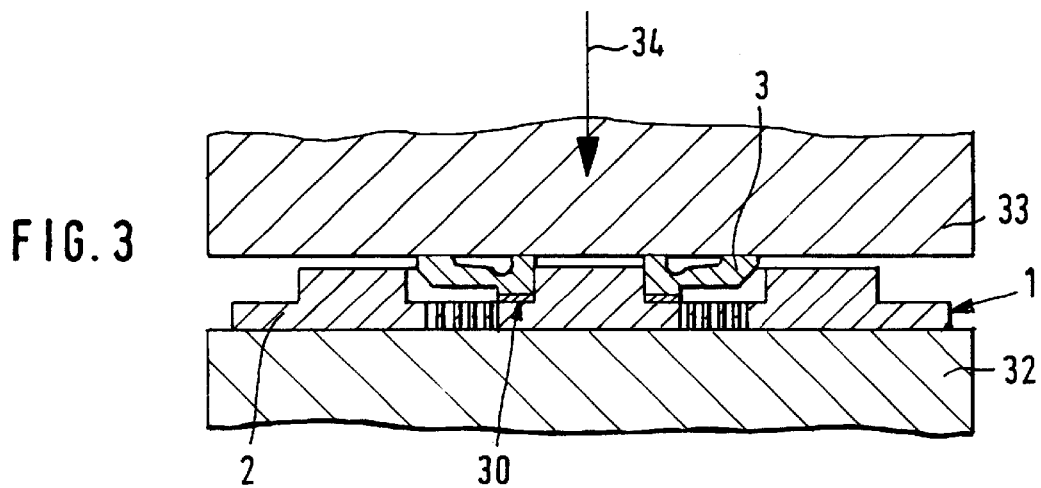
FIG. 3 depicts a schematic depiction of a tool for making diffusion-soldered joints according to an embodiment the present invention.

FIGS. 2 and 3 explain in more detail how a diffusion-soldered joint can be made. The technology is particularly suitable for joint components that cannot be coated partially and in a melt in an immersion bath, for example upper nozzle part 2 and lower nozzle part 3 of nozzle plate 1 depicted in FIG. 1. For this purpose, for example, the two soldered parts to be joined (parts 2 and 3) are pretreated by pickling. A disk-shaped solder carrier 30, coated on both sides with molten solder, which in the exemplified embodiment depicted is annular in shape, is placed between the two parts 2 and 3, which in order to the make the joint are, for example, manipulated upside down with respect to the later installation position of nozzle plate 1 as shown in FIG. 1.

In the exemplified embodiment of nozzle plate 1, solder carrier 30 rests with one of its end surfaces in open region 16 against end surface 20 of upper nozzle part 2, while lower nozzle part 3, with its end surface 24 of contact shoulder 23, contacts solder carrier 30 at its opposite end surface. The sandwich component made up of lower nozzle part 3, solder carrier 30, and upper nozzle part 2 is then heated under pressure (arrow 34) between a schematically indicated heating table 32 and a heated pressing ram 33, and diffusion-soldered. Heating (e.g., at 250° to 450° C.) between the two tool parts 32 and 33 takes place under a pressure of, for example, 100 N/mm$^2$ to 300 N/mm$^2$.

The starting material used for solder carrier 30 is, for example, a foil 35 that is solder-coated on both sides in a solder bath using the passthrough method, the coating thicknesses usually being between approximately 1 and 10 micrometers. Materials particularly suitable for film 35 are copper, nickel, iron, or alloys of copper, nickel and iron. A plurality of solder carriers 30 as shown in FIG. 2 can be punched out of a large-area solder-coated film. Low-melting-point (e.g., <400° c.) soft-solder alloys or multilayer arrangements are provided as solder layers 36. In multilayer arrangements, the individual constituents are applied onto one another, for example, galvanically or by vacuum metallization, the individual layers being a few micrometers thick. Low-melting-point coating alloys for solder layers 36 are, for example, tin/indium, tin/lead/indium, bismuth/indium/tin/lead, tin/silver or tin/copper alloys.

FIG. 4 depicts an arrangement which illustrates how diffusion soldering according to the present invention functions in the case of relatively large-area wafers having a plurality of small parts (in this case nozzle plates 1). In this context, for example, lower nozzle parts 3 continuously constitute the initially one-piece wafer, while solder carriers 30 and upper nozzle parts 2 are placed as individual parts in the respective desired positions with respect to lower nozzle parts 3. Since parts 2 and 3 being joined, as well as solder carrier 30, may exhibit height tolerances in the many nozzle plates 1 being produced, and heating table 32 and pressing ram 33 have flat pressure surfaces, an insert foil 38 is arranged between pressing ram 33 and the workpiece (nozzle plate 1) being joined.

The insert foil 38 serves as a plastically deformable, solder-rejecting, thermally conductive consumable spacer made of anodized aluminum, or of copper plated with chromium or metallized with titanium nitride, to compensate for height differences. An approximately identical pressure over the entire wafer surface is achieved in this fashion. In order to ensure a uniform component height, the linear stroke of pressing ram 33 is limited, for example, by means of a fixed stop (not shown). Arrows 34 in pressing ram 33 in turn illustrate the direction in which a compressive force is applied to the workpieces (e.g., perpendicular to the wafer plane). The thickness of insert foil 38 is in the range between, for example, 50 micrometers and 1 mm. After diffusion soldering, the wafers are divided into the individual components (e.g., nozzle plates 1) by laser cutting, etching, punching, or similar separating methods.

As already mentioned, nozzle plate 1 represents only one selected exemplified embodiment in which a diffusion-soldered joint is used to assemble two joint components. A joint of this kind can also be achieved on components of completely different configuration that require joining; it is particularly suitable for joining complex micromechanical components.

What is claimed is:

1. A diffusion-soldered joint, comprising:

at least two joint components, wherein a first joint component of the at least two joint components has a central fitting element, the central fitting element engaging an opening in a second joint component of the at least two joint components; and a solder carrier disposed between the at least two joint components, the solder carrier including a metal foil having two sides and having at least one solder layer applied to each of the two sides of the metal foil, the at least one solder layer including a soft-solder alloy having a melting point below approximately 400° C., the at least two joint components being joined in response to exposure to a pressure and heat in a tool.

2. The diffusion-soldered joint according to claim 1, wherein the metal foil is solder-coated on each side in a solder bath via a passthrough method.

3. The diffusion-soldered joint according to claim 1, wherein the at least two joint components include one of NiCo, Ni, Fe, and Cu.

4. The diffusion-soldered joint according to claim 1, wherein the metal foil includes one of Cu, Ni, Fe, and an alloy of one of Cu, Ni and Fe.

5. The diffusion-soldered joint according to claim 1, wherein the at least one solder layer includes multilayer arrangement.

6. The diffusion-soldered joint according to claim 5, wherein the multilayer arrangement includes a plurality of individual solder layers each applied by one of a galvanic method and a vacuum metallization.

7. The diffusion-soldered joint according to claim 1, wherein at least one of the at least two joint components is a wafer.

8. The diffusion soldered joint according to claim 1, wherein the tool includes a heating table and a pressing ram.

9. The diffusion soldered joint according to claim 1, wherein:

the at least one solder layer is one of a tin/indium alloy, tin/lead/indium alloy, bismuth/indium/tin/lead alloy, tin/silver alloy and tin/copper alloy.

10. A method of producing a diffusion-soldered joint, comprising the steps of:

inserting a solder carrier between at least two joint components, said solder carrier comprising a metal foil having two sides and having at least one solder layer applied to each side of the foil;

arranging an insert foil between a pressing ram and the at least two components, wherein the insert foil is solder-rejecting against a solder; and applying a pressure and heat to join the at least two components.

11. The method according to claim 10, wherein the insert foil includes one of anodized aluminum, copper plated with chromium and copper metallized with titanium nitride.

12. The method according to claim 10, wherein:

the at least one solder layer is one of a tin/indium alloy, tin/lead/indium alloy, bismuth/indium/tin/lead alloy, tin/silver alloy and tin/copper alloy.

13. A diffusion-soldered joint, comprising:

at least two joint components, wherein a first joint component of the at least two joint components has a central fitting element, the central fitting element engaging an opening in a second joint component of the at least two joint components; and a solder carrier disposed between the at least two joint components, the solder carrier including a metal foil having two sides and having at least one solder layer applied to each of the two sides of the metal foil, the at least one solder layer including a soft-solder alloy having a melting point below approximately 400° C., the at least two joint components being joined in response to exposure to a pressure and heat.

14. The diffusion-soldered joint according to claim 13 the at least one solder layer is one of a tin/indium alloy, tin/lead/indium alloy, bismuth/indium/tin/lead alloy, tin/silver alloy and tin/copper alloy.

* * * * *